United States Patent
Ros Vega et al.

(10) Patent No.: US 12,298,733 B2
(45) Date of Patent: May 13, 2025

(54) MACHINING HEAD WITH ACTIVE CORRECTION, METHOD FOR OPERATING THE HEAD AND USE THEREOF

(71) Applicant: LOXIN 2002, S.L., Navarra (ES)

(72) Inventors: Ivan Ros Vega, Navarra (ES); Carlos Diaz De Rada, Navarra (ES); Carlos Ganchegui Iturria, Navarra (ES)

(73) Assignee: LOXIN 2002, S.L., Navarra (ES)

( * ) Notice: Subject to any disclaimer, the term of this patent is extended or adjusted under 35 U.S.C. 154(b) by 464 days.

(21) Appl. No.: 17/600,517

(22) PCT Filed: Feb. 20, 2020

(86) PCT No.: PCT/ES2020/070127
§ 371 (c)(1),
(2) Date: Sep. 30, 2021

(87) PCT Pub. No.: WO2020/212631
PCT Pub. Date: Oct. 22, 2020

(65) Prior Publication Data
US 2022/0214658 A1    Jul. 7, 2022

(30) Foreign Application Priority Data

Apr. 17, 2019   (ES) ............................... ES201930353

(51) Int. Cl.
*G05B 19/404*   (2006.01)
*B23Q 15/12*    (2006.01)

(52) U.S. Cl.
CPC ........... *G05B 19/404* (2013.01); *B23Q 15/12* (2013.01); *G05B 2219/41113* (2013.01)

(58) Field of Classification Search
None
See application file for complete search history.

(56) References Cited

U.S. PATENT DOCUMENTS

| 4,613,262 A | 9/1986 | Woods |
| 5,848,859 A * | 12/1998 | Clark .................. G05B 19/404 |
| | | 901/41 |

(Continued)

FOREIGN PATENT DOCUMENTS

| ES | 2336624 T3 | 4/2010 |
| ES | 2522921 A1 | 11/2014 |

(Continued)

OTHER PUBLICATIONS

International Search Report for corresponding PCT application No. PCT/ES2020/070127, mailed Jun. 8, 2020.

*Primary Examiner* — Jason Lin
(74) *Attorney, Agent, or Firm* — Notaro, Michalos & Zaccaria P.C.

(57) ABSTRACT

A machining head with active correction of the type used in association with a robot to carry out fast high-precision machining tasks especially on parts for the aeronautical production industry that has localised position and angular sensors, and a machining motor or spindle provided with localised movement with respect to the head casing, independent of the robot's movement, this movement being preferably both displacement and rotation with respect to both, allowing active correction of the machining position is disclosed. The invention provides the main advantage of allowing errors by the robot or deformation of the part to be machined, in positioning for machining, to be corrected in a localised very fast and accurate way, without the need to re-position the robot.

13 Claims, 9 Drawing Sheets

(56) References Cited

U.S. PATENT DOCUMENTS

| | | | | |
|---|---|---|---|---|
| 5,910,894 A * | 6/1999 | Pryor | G05B 19/41875 |
| | | | 700/95 |
| 5,920,974 A * | 7/1999 | Bullen | B23Q 41/04 |
| | | | 29/430 |
| 6,098,260 A * | 8/2000 | Sarh | B64F 5/10 |
| | | | 227/52 |
| 6,158,666 A * | 12/2000 | Banks | B21J 15/142 |
| | | | 238/10 R |
| 6,855,099 B2 * | 2/2005 | Hazlehurst | B21C 51/005 |
| | | | 33/286 |
| 7,681,293 B2 * | 3/2010 | Lanni | B21J 15/10 |
| | | | 29/524 |
| 8,021,089 B2 * | 9/2011 | Eriksson | B23B 47/287 |
| | | | 408/97 |
| 8,225,508 B2 * | 7/2012 | Houis | B23B 47/287 |
| | | | 29/525.01 |
| 8,347,470 B2 * | 1/2013 | Gonzalez | B25J 15/0095 |
| | | | 408/97 |
| 8,566,054 B1 * | 10/2013 | Schweigert | B64F 5/60 |
| | | | 702/158 |
| 8,671,584 B2 * | 3/2014 | Meisman | G05G 5/00 |
| | | | 33/645 |
| 8,989,898 B2 | 3/2015 | DeVlieg | |
| 9,751,641 B2 * | 9/2017 | Stone | B64F 5/10 |
| 9,919,428 B2 * | 3/2018 | Anducas Aregall | B25J 9/1697 |
| 10,183,367 B2 * | 1/2019 | Jesu Plu | B23Q 17/2471 |
| 10,265,780 B2 * | 4/2019 | Ono | B64F 5/10 |
| 10,953,459 B2 * | 3/2021 | Viscardi | E05D 3/142 |
| 2009/0018697 A1 * | 1/2009 | Prat | B21J 15/142 |
| | | | 700/245 |
| 2011/0320031 A1 | 12/2011 | Cornelius et al. | |
| 2014/0135989 A1 | 5/2014 | Melikian et al. | |
| 2016/0082598 A1 * | 3/2016 | Anducas Aregall | B25J 19/022 |
| | | | 901/10 |
| 2017/0151643 A1 * | 6/2017 | Ficken | B23Q 17/2495 |

FOREIGN PATENT DOCUMENTS

| | | |
|---|---|---|
| WO | 2004028755 A1 | 4/2004 |
| WO | 2014054802 A1 | 4/2014 |

* cited by examiner

MACHINING HEAD WITH ACTIVE CORRECTION, METHOD FOR OPERATING THE HEAD AND USE THEREOF

The present description relates, as its title indicates, to a machining head with active correction of the type used in association with a robot to carry out fast high-precision machining tasks, especially on parts in the aeronautical production industry, which has localised position and angle sensors and a machining motor or spindle provided with localised movement with respect to the head casing, independent of the robot's movement, this movement being both displacement and rotation with respect to both, or any other system of axes that enables the tool to swivel in such a way that it allows to correct the orientation of drilling or machining with respect to the surface of the part, and thus correct the position of the drilling tip, ultimately correcting the position and angle, allowing active correction of the machining position without correcting the axes of the robot itself.

FIELD OF THE INVENTION

The invention refers to the field of machining heads used together with robots in industrial manufacturing.

CURRENT STATE OF THE ART

Numerous types of robots are currently known and used, especially in the field of precision machining, particularly for the manufacture of elements in the aeronautical industry, in which the large number of bores and rivets that are used make them essential. For this purpose robots of various types have been used, anthropomorphic, parallel kinematic robots, etc. During machining, the robot presses the head against the part to be machined, or it positions it in front, and the head itself exerts the necessary force by means of an internal device and then performs the machining operation. However, very often when pressing the head, it moves slightly or changes its normality due to the part yielding or deforming slightly with the pressure, or due to the robot itself yielding with the pressure, causing the head to slip and/or lose or change its normality with respect to the part.

To avoid the effects of robot or part deformation due to the stress of the pressure foot, the following technologies exist: on the one hand, using artificial vision systems to improve precision, such as, for example that described in ES2522921 "Head and automatic machining procedure with vision", or devices such as that described in patent ES2336624 "Positioning procedure of an assembly tool at the end of an articulated arm and device for its implementation" which offsets the effect of the pressure foot by measuring the swivel angle between a firmly secured part of the support plate and a second part that can be applied and that is stationary with respect to the said surface, allowing the said parts to join in a relative movement, according to at least one swivel axis. Another known technique is described in U.S. Pat. No. 8,989,898 "Robot manufacturing system with accurate control", which, given the lack of stiffness and accuracy of commercial robots, adds a secondary measuring system on each axis in such a way that greater precision and stiffness is achieved, since if, in the process of applying the pressure foot, the robot is liable to deform, the secondary measuring systems detect these deformations and instantly correct them. However all these units and procedures have the same problem which is that once the positioning and/or angle error is detected, in order to position the head in its correct place again, or to correct its normality, the whole of the robot arm has to be moved and re-positioned at the new coordinates, and in some cases this means recalculating the error and repeating as many times as required until it is correctly positioned within the required tolerances before machining, which affects the speed of the process because the movements of the robot require a certain positioning time due to its great moving masses and inertias.

With very high, demanding requirements for positioning accuracy and/or normality, in addition to requiring very fast processing, most robots, except for parallel kinematic robots, are no longer able to operate, preventing their use.

DESCRIPTION OF THE INVENTION

To resolve the currently existing problem of the accuracy and speed in part machining by robots, the machining head with active correction that is the object of this invention has been envisaged, consisting of a machining motor or spindle provided with localised movement with respect to the head casing, independent of the robot's movement, this movement being preferably both displacement on the X, Y and Z axes and rotation with respect to X and to Y, allowing active correction of the machining position.

For this purpose, the head has
a casing fixed to the end of the robot with a pressure foot with a central opening,
a drilling motor inside the casing, provided with means of advancing and moving back with respect to the part to be machined,
one or several sensors of position and angle, preferably video cameras associated with artificial vision equipment,
localised means of movement, independent of the robot's movement, of the drilling motor with respect to the casing and
means of communication with a control computer equipment.

The machining head with active correction is also associated with a specific operating procedure which comprises
a step of positioning at the programmed point of the part to be machined,
a step of pushing the head on to the part to be machined,
a verification step by means of the sensors of the position and angle of the drilling motor and its associated tool,
if the result of the verification step by means of the sensors of the position and angle of the drilling motor and its associated tool indicates that the actual point of machining does not correspond to the programmed point, or its displacement and/or normality is outside the accepted tolerance, a step of correcting the position of the drilling motor and its tool with respect to the casing is carried out, then again repeating the verification step by means of the sensors of the position and angle of the drilling motor and its associated tool, repeating this part of the process as many times as is necessary until it is within the accepted position and/or angle tolerance,
a machining step and
a withdrawal step.

The use of this machining head with active correction, with its operating procedure, is precision machining, preferably for carrying out bores in parts for the aeronautical production industry for subsequent riveting.

ADVANTAGES OF THE INVENTION

This machining head with active correction that is presented affords numerous advantages over currently available systems, the most important advantage being that once the head is under pressure on the part, subsequent re-positioning to correct an error does not require moving the whole robot, which is a relatively slow process because of the large mass to be moved, and lack of precision of the axes due to the drives themselves and large actuator levers, but only the spindle needs to be moved which, due to its low mass can be moved much faster, with less inertia and with greater accuracy.

For this reason it is noteworthy that it allows the correction of errors by the robot in positioning for machining, in a quick, precise manner without having to re-position the robot.

It is important to highlight that if the verification process has to be repeated several times, because the movements are short and localised, the operation of the assembly is not penalised unlike conventional procedures that have to repeat the process by moving the whole assembly repeatedly by means of the robot.

Another important advantage is that this allows lower precision robots to be used, such as for example anthropomorphic robots for precision machining tasks, without the need for high processing times for re-positioning.

A further advantage of the present invention is that because it allows anthropomorphic robots to be used, it can be reused in manufacturing processes that require greater speed and accuracy without having to carry out a large financial investment.

It must also be mentioned that the use of sensors for measuring and verifying the position and angle, adds greater speed and precision to operating.

It is interesting to highlight that this head can be used with robots of all types, allowing their positioning speed and accuracy to be notably improved, making them apt for high-demand machining production and enabling their useful life to be extended.

DESCRIPTION OF THE FIGURES

To provide a better understanding of this invention, a preferred practical embodiment of a machining head with active correction, with video cameras as sensors, is shown in the drawing attached.

In the said drawing FIG. 1—shows a simplified general diagram of the head in its rest position.

PREFERRED EMBODIMENT OF THE INVENTION

The conformation and characteristics of the invention can be better understood in the following description that relates to the attached figures.

Figure 1:
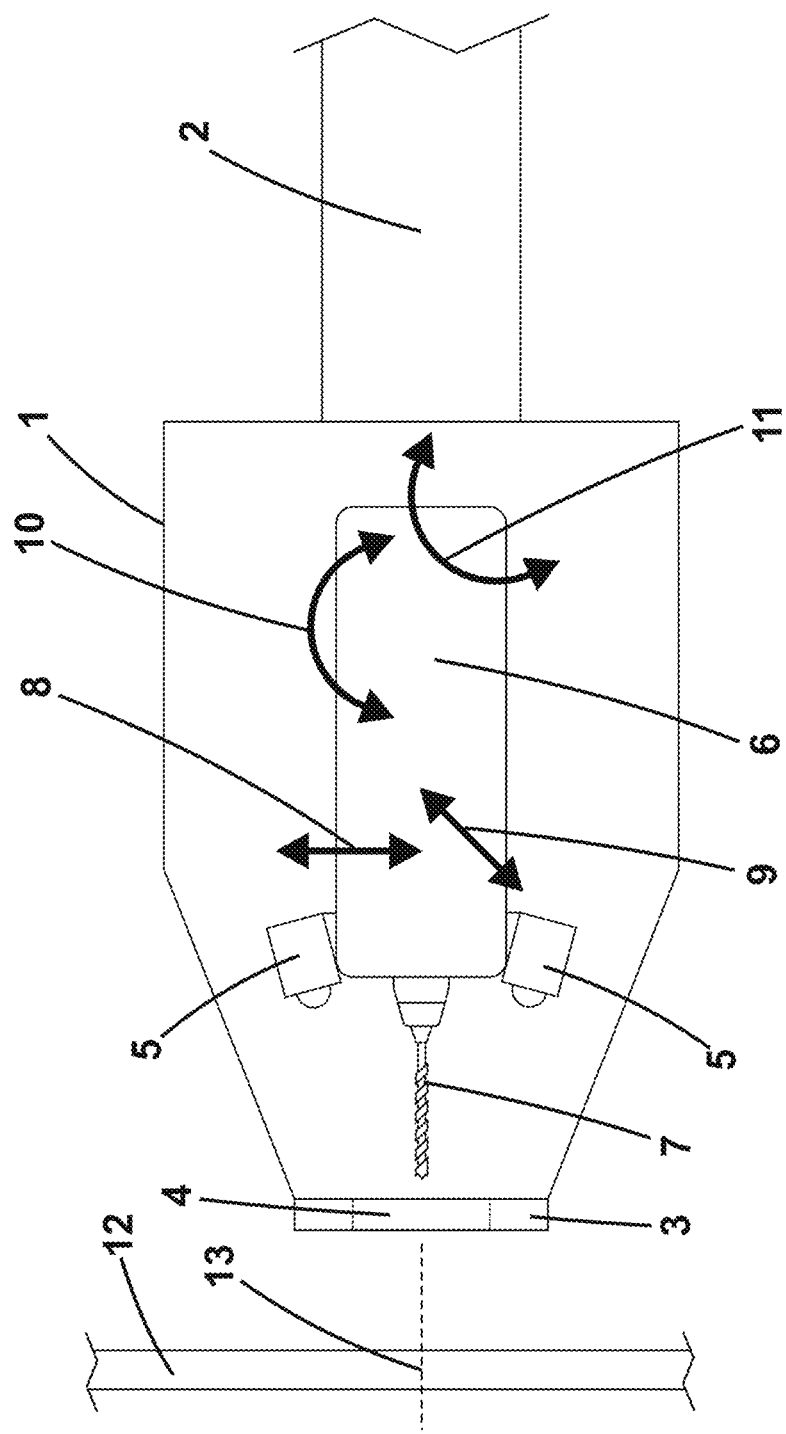
FIG. 1—shows a detail of part of the elements of an example of a head.
Figure 11:
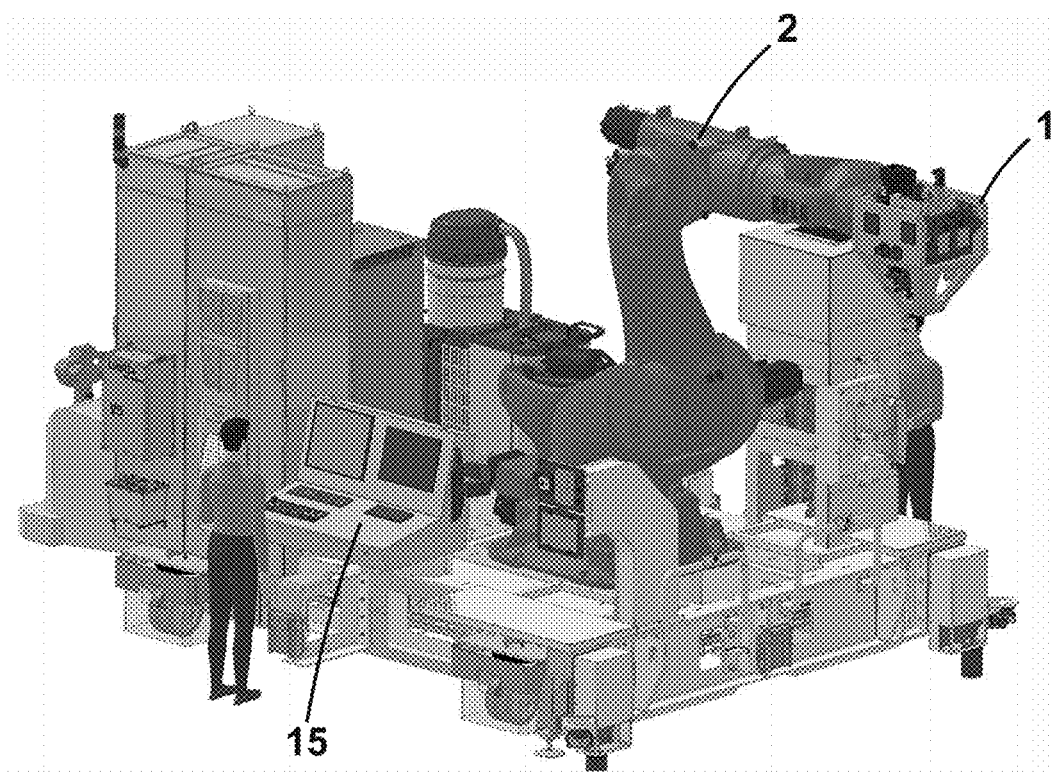
FIG. 11—shows an example of an installation of a robot with this head.
Figure 12:
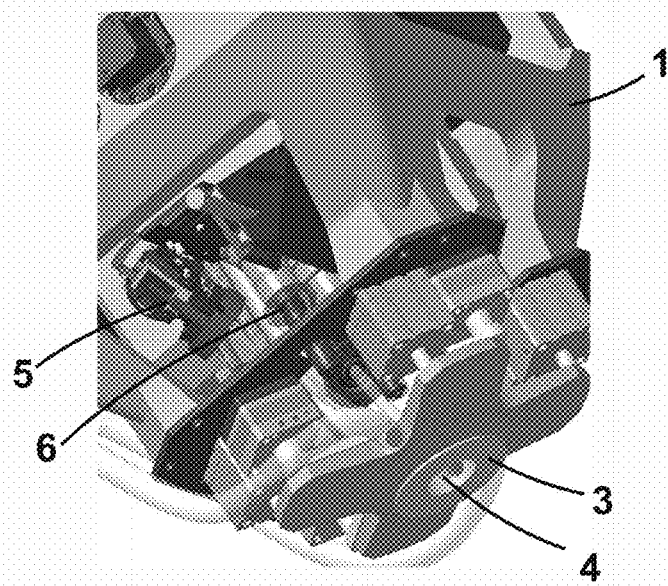
FIG. 12—shows a detail of part of the elements of an example of a head.
Figure 13:
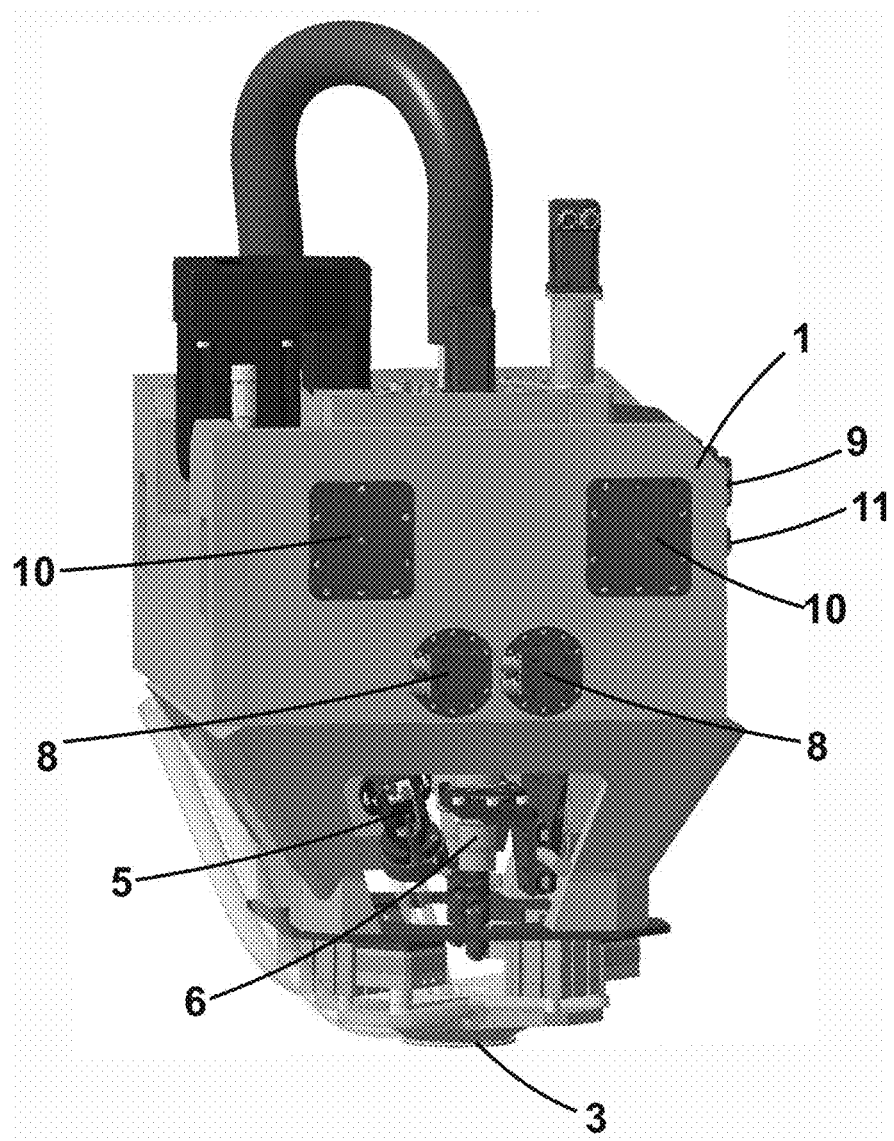
FIG. 13—shows an external view of an example of a head.
Figure 14:
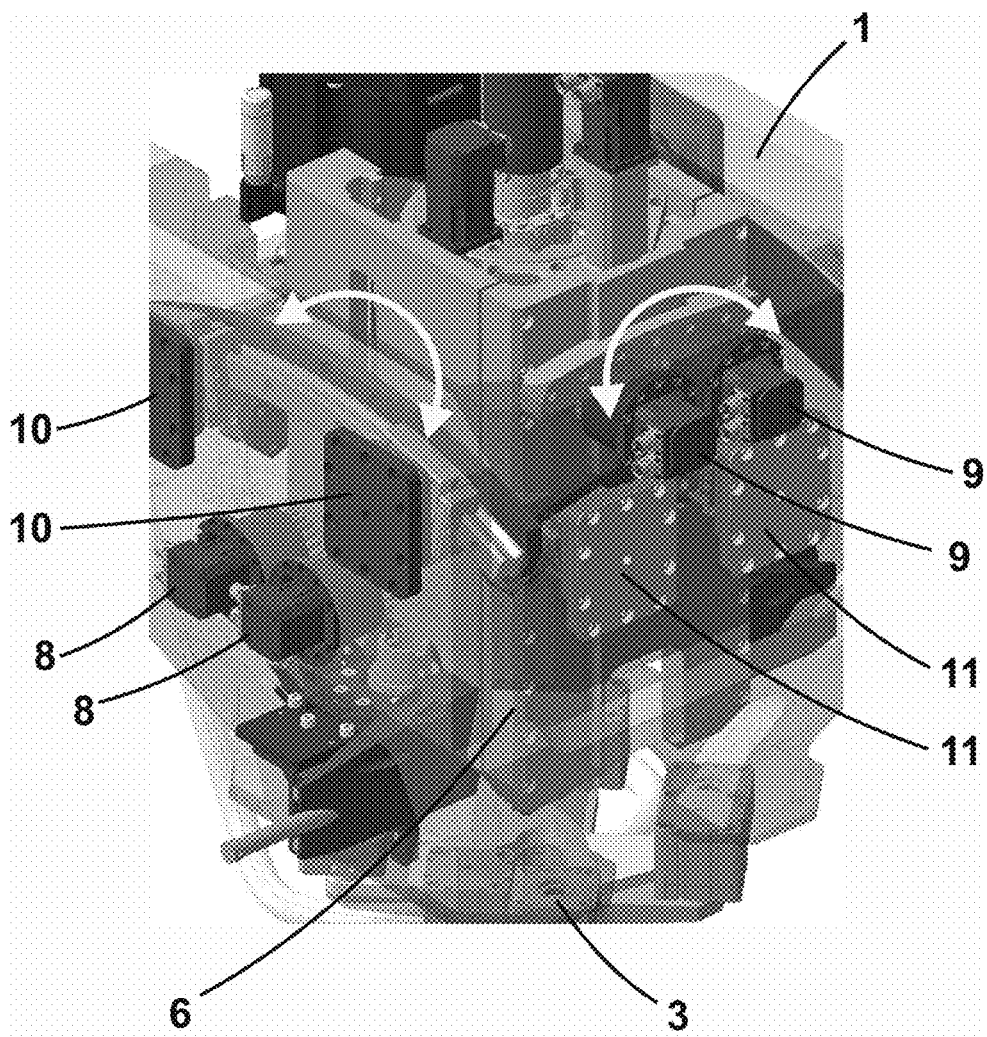
FIG. 14—shows a detail by transparency of part of the elements in an example of a head.
Figure 15:
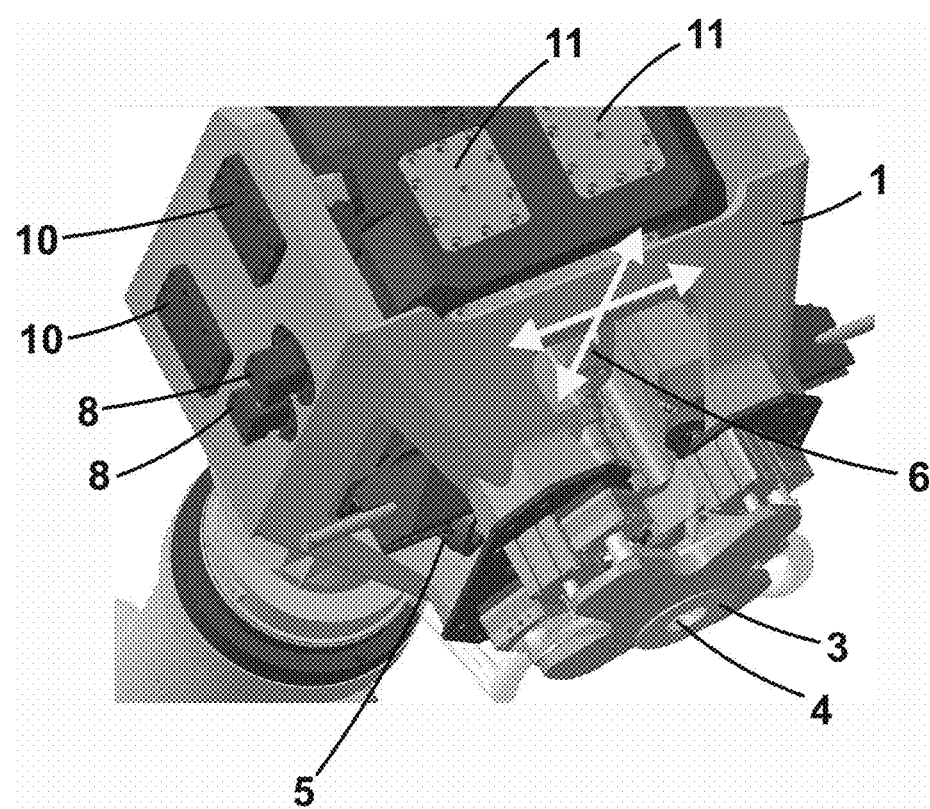

As can be seen in FIGS. 1,11,12,13,14, and 15, a machining head with active correction, of the type used in association with a robot to carry out, fast high-precision machining tasks is shown, that comprises
  a casing (1) fixed at the end of the robot (2) by means of attachment and connection means, provided at one end with a pressure foot (3) with a central opening (4),
  a drilling motor (6) or spindle, with an interchangeable associated tool (7), located inside the casing (1), provided with means of advancing and moving back on the Z-axis with respect to the part (12) to be machined,
  one or several sensors (5) of position and angle,
  localised means of movement, independent of the movement of the robot (2), of the drilling motor (6) with respect to the casing (1),
  means of communication with control computer equipment (15).

The localised means of movement, independent of the movement of the robot (2), of the drilling motor (6) with respect to the casing (1) preferably comprise
  means of displacement on the Y-axis (8) of the drilling motor (6) and video cameras (5) assembly with respect to the casing (1),
  means of displacement on the X-axis (9) of the drilling motor (6) and video cameras (5) assembly with respect to the casing (1),
  means of rotation with respect to the Y-axis (10) of the drilling motor (6) and video cameras (5) assembly with respect to the casing (1), and
  means of rotation with respect to the X-axis (11) of the drilling motor (6) and video cameras (5) assembly with respect to the casing (1), The means of displacement on the Y-axis (8) and the means of displacement on the X-axis (9) comprise a combination of motors with drive systems, such as for example attack pinion and rectilinear racks, spindles or cams.

The means of rotation with respect to the Y-axis (10) and the means of rotation with respect to the X-axis (11) comprise a combination of motor drive systems, such as for example, guides and curved racks.

The sensor or sensors (5) can be optical sensors, video cameras, distance sensors, pressure sensors, laser profilometers, etc. or any combination thereof. In a preferred embodiment the sensors (5) of position and angle are at least two video cameras, attached to the drilling motor (6) and associated with artificial vision equipment.

The pressure foot (3) can be a pressure foot (3) fixed to the casing (1) and hence moved by the robot (2) or a pressure foot (3) provided with means of advancing and moving back independent with respect to the casing (1). In a preferred embodiment the pressure foot (3) has a surface contact bearing, provided with angular position sensors that are part of the sensors (5)

The control computer equipment (15) comprises specific software for the general joint movement of the robot (2) and the casing (1), the correction of position and angle, by means of the localised means of movement, of the drilling motor (6) with respect to the casing (1) and the processing of the signals of the sensors (5).

Figure 2:
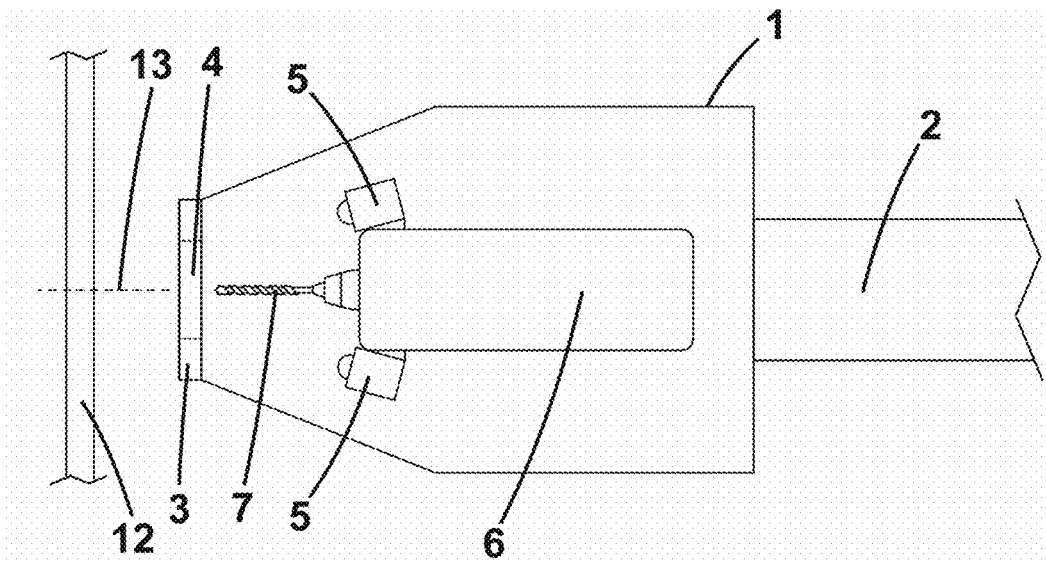
FIG. 2—shows a simplified general diagram of the head in the step of positioning at the programmed point of the part to be machined and the step of taking an image of the surface of the programmed point of the part to be machined.
Figure 3:
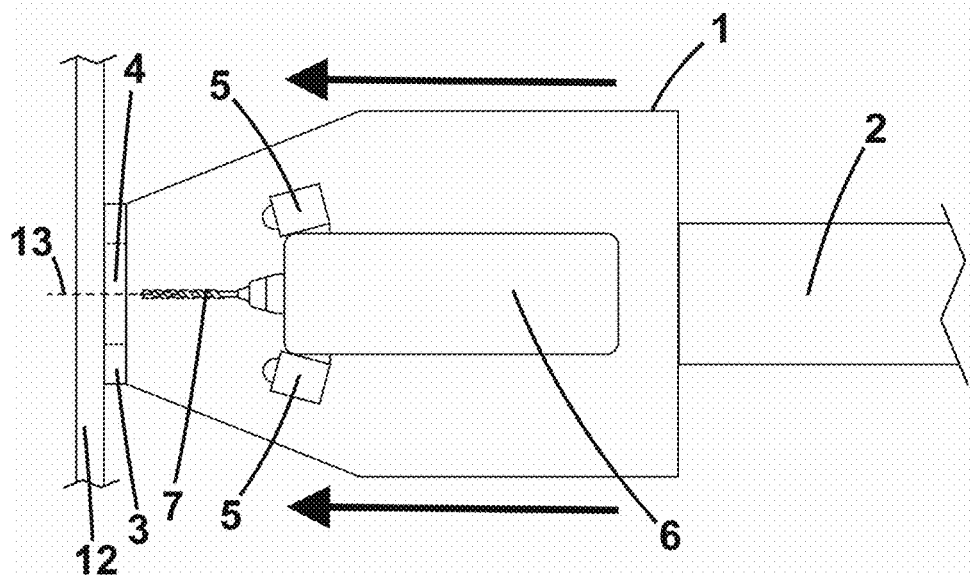
FIG. 3—shows a simplified general diagram of the head in the step of pushing the head on to the part to be machined.
Figure 4:
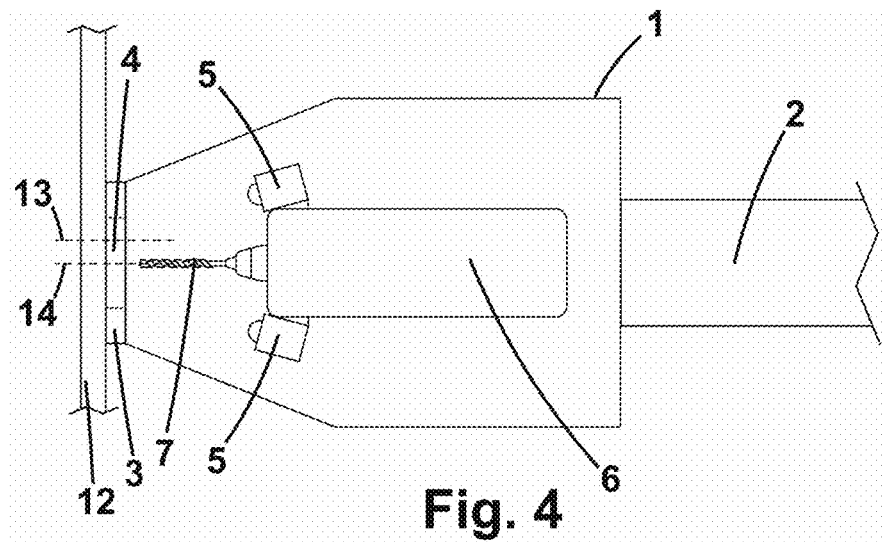
FIG. 4—shows a simplified general diagram of the head in the step of visual verification of the position of the drilling motor and its associated tool, in a case in which after the step of pressing the head on to the part to be machined, there has been a linear and/or angular displacement of the head with respect to the part, due to the effect of the pressure.
Figure 5:
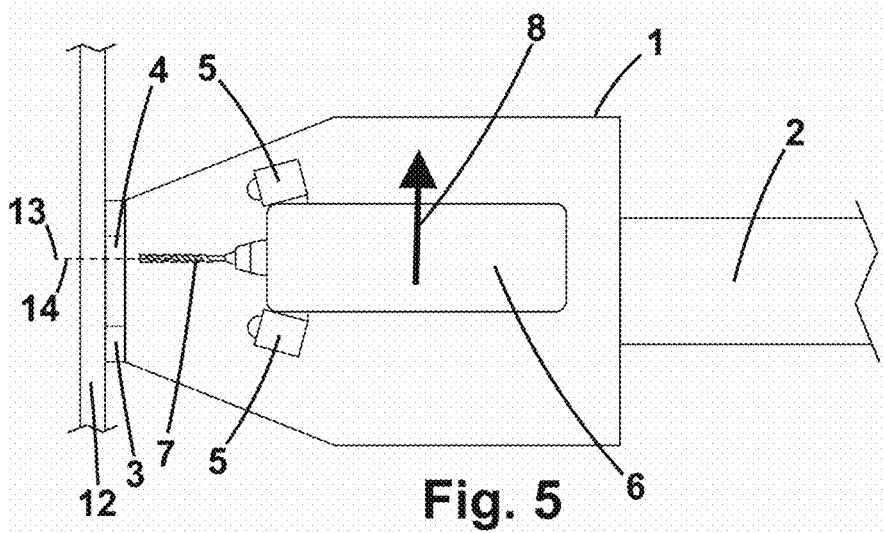
FIG. 5—shows a simplified general diagram of the head in the step of correcting the position of the drilling motor and its tool, with respect to the casing.
Figure 6:
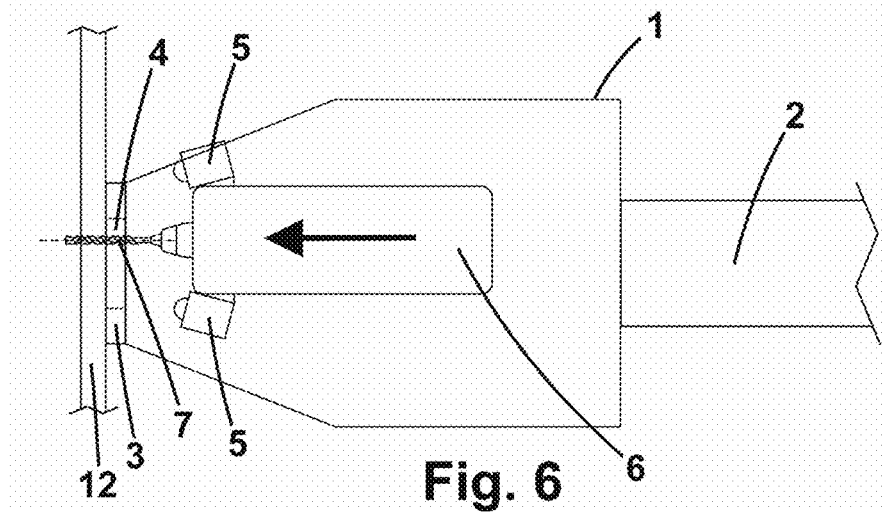
FIG. 6—shows a simplified general diagram of the head in the step of machining, after having corrected and verified the position of the drilling motor and its associated tool.
Figure 7:
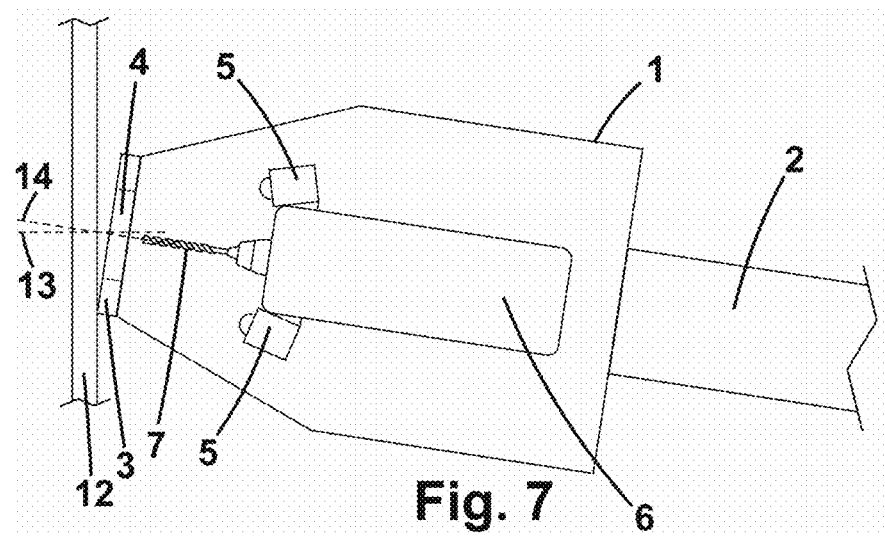
FIG. 7—shows a simplified general diagram of the head in the step of visual verification of the position of the drilling motor and its associated tool, in a case in which after the step of pressing the head on to the part to be machined, there has been a change in the normality of the head with respect to the part, due to the effect of the pressure.
Figure 8:
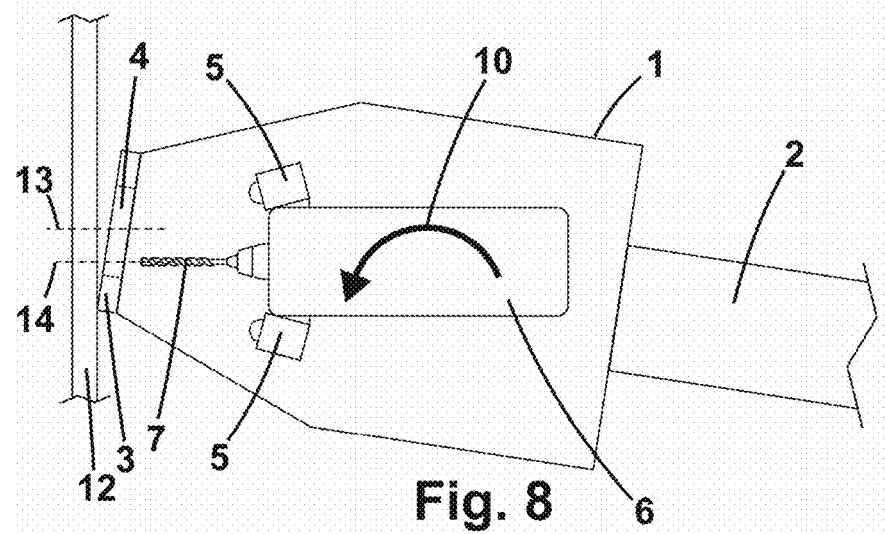
FIG. 8—shows a simplified general diagram of the head in the step of correcting the normality of the drilling motor and its tool, with respect to the casing.
Figure 9:
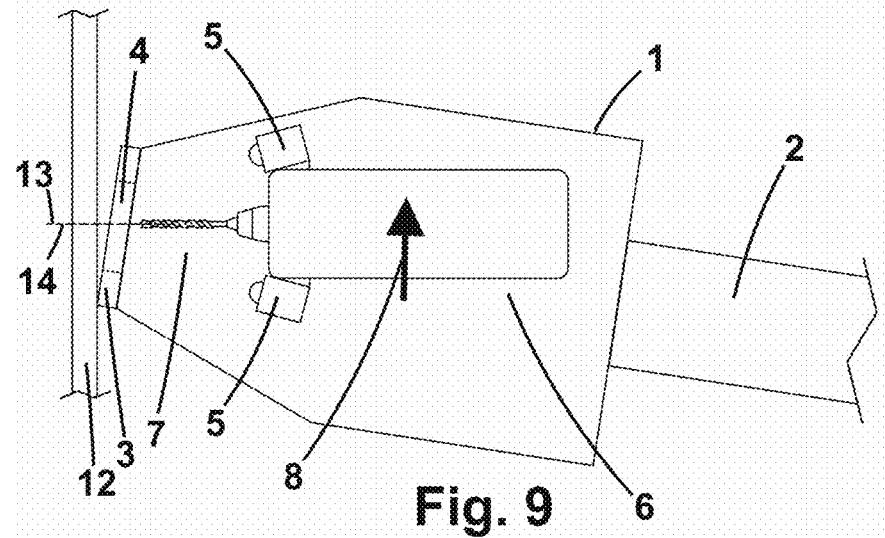
FIG. 9—shows a simplified general diagram of the head in the step of correcting the position of the drilling motor and its tool, with respect to the casing after previously having corrected normality.
Figure 10:
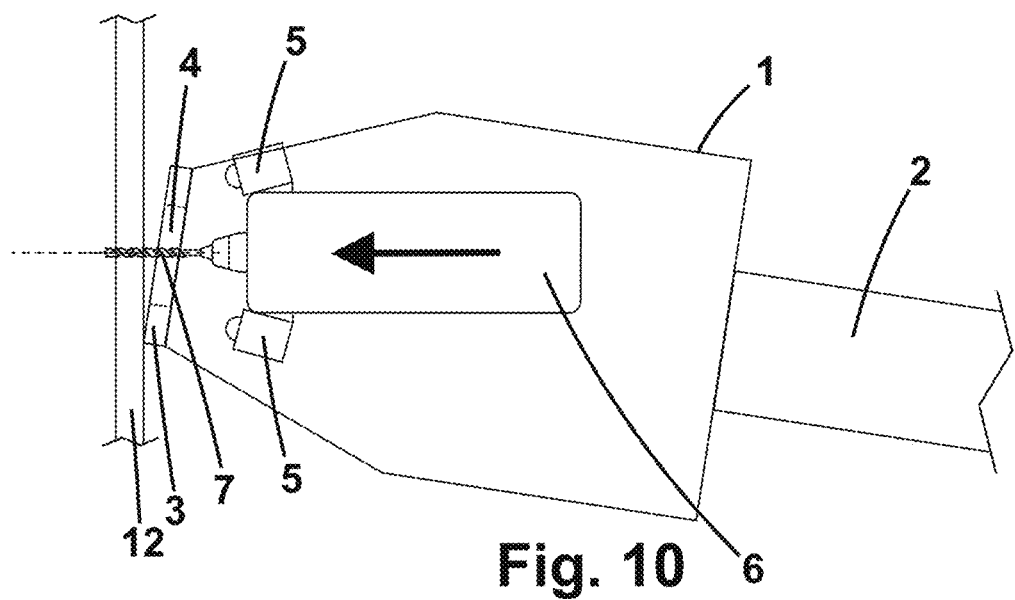
FIG. 10—shows a simplified general diagram of the head in the machining step, after having corrected and verified both the normality and the position of the drilling motor and its associated tool.

The machining head with active correction is also associated with a specific operating procedure, illustrated in FIGS. 2, 3, 4, 5, 6, 7, 9 and 10, which comprises
- a step of positioning at the programmed point (13) of the part (12) to be machined,
- a step of pushing the head on to the part (12) to be machined,
- a verification step by means of sensors (5) of the position and angle of the drilling motor (6) and its associated tool (7),
- if the result of the verification step by means of the sensor or sensors (5) of the position and angle of the drilling motor (6) and its associated tool (7) indicates that the actual point (14) of machining does not correspond to the programmed point (13), or its displacement and/or normality is outside the accepted tolerance, a step of correcting the position and/or normality of the drilling motor (6) and its tool (7) with respect to the casing (1) is carried out, then again repeating the verification step by means of the sensor or sensors (5) of the position and angle of the drilling motor (6) and its associated tool (7), repeating this part of the process as many times as is necessary until it is within the accepted position and/or normality tolerance.
- a machining step and
- a withdrawal step.

The step of positioning at the programmed point (13) of the part (12) to be machined comprises,
- the movement, by means of the robot (2), of the casing (1) to position the central opening (4) of the pressure foot (3) centred over the programmed point (13), at a short distance from the part (12) to be machined, but without coming into contact with it, and
- if the sensor or sensors (5) of position and angle are video cameras associated with artificial vision equipment, taking an image of the surface of the programmed point (13) of the part (12) to be machined and storing the said image in the control computer equipment (15).

The step of pushing the head on to the part (12) to be machined is carried out by the robot (2), moving the casing (1) until its pressure foot (3) comes into contact with the surface of the part (12) to be machined, maintaining a programmed pressure.

The verification step by means of the sensor or sensors (5) of the position and angle of the drilling motor (6) and its associated tool (7), in the event that the sensor or sensors (5) of position and angle are video cameras associated with artificial vision equipment, is carried out by taking a second image of the zone where the pressure foot (3) is positioned by means of the sensor or sensors (5), and comparing it to that previously taken, which is stored in the control computer equipment (15), detecting in both images, by means of image analysis techniques, the same uneven elements on the surface and calculating the possible displacement existing between the two images, which would correspond to the displacement existing between the coordinates of the programmed point (13) and those of the actual point (14) of machining, as well as any possible alterations in the normality of the head.

The step of correcting the position of the drilling motor (6) and its tool (7) with respect to the casing (1) includes:
- the activation of the localised means of movement, according to the information provided in the verification step by means of the sensor or sensors (5) of the position and angle of the drilling motor (6) and its associated tool (7), to correct the existing displacement, where appropriate, and/or the existing variation in normality, where appropriate, of the drilling motor (6) and its tool (7) with respect to the casing (1).

The machining step comprises the advance of the drilling motor (6) via the pressure foot (3), in the current position and angle.

The withdrawal step comprises
- The moving back of the drilling motor (6) through the pressure foot (3) to inside the casing (1),
- a separating of the pressure foot, if provided with its own means of advancing and moving back,
- the movement, by means of the robot (2), of the casing (1) until it is separated from the part (12),
- the activation of the localised means of movement to take the drilling motor (6) to its central position, without correction of position and
- the activation of the localised means of movement to take the drilling motor (6) to its position parallel to the casing (1), without correction of normality, the assembly now being ready for another operation.

The use of this machining head with active correction, with its operating procedure, is for precision machining, preferably for carrying out bores in parts for the aeronautical production industry for subsequent riveting, riveting, milling, orbital machining or milling of pockets.

A person skilled in the art will easily comprehend that the characteristics of different embodiments can be combined with the characteristics of other possible embodiments, provided that the combination is technically possible.

All of the information referring to examples or embodiments form part of the description of the invention.

The invention claimed is:

1. A machining head with active correction, comprising:
a casing fixed at the end of a robot by means of attachment and connection means, provided at one end with a pressure foot with a central opening, the pressure foot adapted to be the only part of the casing to contact a part to be machined,
a drilling motor with an interchangeable associated tool, located inside the casing, provided with means of advancing and moving back of the drilling motor on a Z-axis with respect to the part to be machined,
one or more sensors of position and angle attached to the drilling motor, localized means of movement, independent of movement of the robot, of the drilling motor with respect to the casing, wherein the localized means of movement, independent of the movement of the robot, of the drilling motor with respect to the casing comprise:
means of displacement on the Y-axis of the drilling motor and video cameras assembly with respect to the casing,
means of displacement on the X-axis of the drilling motor and video cameras assembly with respect to the casing,
means of rotation with respect to the Y-axis of the drilling motor and video cameras assembly with respect to the casing, and
means of rotation with respect to the X-axis of the drilling motor and video cameras assembly with respect to the casing; and
means of communication with control computer equipment.

2. The machining head with active correction, according to claim 1, wherein the sensors of position and angle are at least two video cameras and associated with artificial vision equipment.

3. The machining head with active correction, according to claim 1, wherein the pressure foot is chosen from a group formed by pressure foot fixed to the casing and pressure foot provided with means of advancing and moving back independent with respect to the casing.

4. The machining head with active correction, according to claim 1, wherein the pressure foot has a surface contact bearing, provided with angular position sensors that are part of the sensors.

5. The machining head with active correction, according to claim 1, wherein the control computer equipment comprises specific software for joint movement of the robot and the casing, for correction of position and angle, by means of the localized means of movement, of the drilling motor with respect to the casing, and for processing of the signals of the sensor or sensors.

6. A method of precision machining, comprising the step of performing an operating procedure employing the machining head with active correction according to claim 1 with a robot.

7. The method of precision machining according to claim 6, wherein the precision machining method comprises forming bores in parts for an aeronautical production industry for subsequent riveting, milling, orbital machining or milling of pockets.

8. An operating procedure of a machining head with active correction according to claim 1, comprising:
a step of positioning the part to be machined at a programmed point of the part,
a step of pushing the head against the part to be machined,
a verification step by means of the sensors of the position and angle of the drilling motor and the interchangeable associated tool to determine whether an actual point of machining does not correspond to the programmed point, by means of the sensors of the position and angle attached to the drilling motor and the interchangeable associated tool,
a step of correcting the position and/or normality of the drilling motor and the interchangeable associated tool with respect to the casing,
a machining step, and
a withdrawal step.

9. The operating procedure of a machining head with active correction, according to claim 8, wherein the step of positioning at the programmed point of the part to be machined comprises:
movement, by means of the robot, of the casing to position the central opening of the pressure foot centered over the programmed point, at a distance from the part to be machined, but without coming into contact with the part.

10. The operating procedure of a machining head with active correction, according to claim 8, wherein the step of pushing the head on to the part to be machined is carried out by the robot, moving the casing until the pressure foot comes into contact with the surface of the part to be machined, maintaining a programmed pressure.

11. The operating procedure of a machining head with active correction, according to claim 8, wherein the step of correcting the position of the drilling motor and the interchangeable associated tool with respect to the casing comprises:
the activation of the localized means of movement, according to information provided in the verification step by means of the sensor or sensors of the position and angle attached to the drilling motor and, to correct an existing displacement, and/or an existing variation in normality, where appropriate, of the drilling motor and the interchangeable associated tool with respect to the casing.

12. The operating procedure of a machining head with active correction, according to claim 8, wherein the machining step comprises advance of the drilling motor through the pressure foot, in a current position and angle.

13. The operating procedure of a machining head with active correction, according to claim 8, wherein the withdrawal step comprises
a moving back of the drilling motor through the pressure foot to inside the casing,
a movement, by means of the robot, of the casing until the casing is separated from the part,
activation of the localized means of movement to take the drilling motor to a first position, without correction of position, and
activation of the localized means of movement to take the drilling motor to a second position parallel to the casing, without correction of normality, the machining head now being ready for another operation.

* * * * *